(12) United States Patent
Ramaswamy et al.

(10) Patent No.: US 8,849,924 B2
(45) Date of Patent: Sep. 30, 2014

(54) NETWORK INFRASTRUCTURE MANAGEMENT

(75) Inventors: Sanjay H. Ramaswamy, Redmond, WA (US); GuangSheng Bao, Beijing (CN); Yingtao Dong, Redmond, WA (US); Yun-Rui SiMa, Beijing (CN); Feng Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1040 days.

(21) Appl. No.: 12/756,230

(22) Filed: Apr. 8, 2010

(65) Prior Publication Data
US 2011/0252096 A1   Oct. 13, 2011

(51) Int. Cl.
G06F 15/16 (2006.01)
H04L 29/08 (2006.01)
H04L 12/24 (2006.01)
H04L 12/751 (2013.01)

(52) U.S. Cl.
CPC ........ H04L 29/08315 (2013.01); H04L 41/082 (2013.01); H04L 41/12 (2013.01); H04L 41/5058 (2013.01); H04L 45/02 (2013.01)
USPC ................ 709/206; 709/223; 370/254; 718/1

(58) Field of Classification Search
CPC . H04L 29/08315; H04L 41/082; H04L 41/12; H04L 41/5058; H04L 45/02
USPC ........................................................ 709/206
See application file for complete search history.

(56) References Cited

U.S. PATENT DOCUMENTS

| | | | | |
|---|---|---|---|---|
| 6,067,093 A * | 5/2000 | Grau et al. | ..................... | 345/440 |
| 2006/0048141 A1 * | 3/2006 | Persson et al. | ................ | 717/176 |
| 2009/0037829 A1 | 2/2009 | Sun et al. | ....................... | 715/762 |
| 2009/0245138 A1 * | 10/2009 | Sapsford et al. | .............. | 370/254 |
| 2009/0300152 A1 | 12/2009 | Ferris | ............................. | 709/223 |
| 2009/0328033 A1 * | 12/2009 | Kohavi et al. | ..................... | 718/1 |
| 2010/0027552 A1 * | 2/2010 | Hill | ............................... | 370/401 |

OTHER PUBLICATIONS

Henry Hai et al., "SaaS and Integration Best Practices", Fujitsu Sci. Tech. J., vol. 45, No. 3, Jul. 2009, pp. 257-264, http://www.fujitsu.com/downloads/MAG/vol45-3/paper03.pdf.

George Feuerlicht et al., "SOA: Trends and Directions," Systems Integration 2009, Published Date: 2009, pp. 149-155, http://si.vse.cz/archive/proceedings/2009/soa-trends-and-directions.pdf.

(Continued)

*Primary Examiner* — Arvin Eskandarnia
(74) *Attorney, Agent, or Firm* — Louise Bowman; Jim Ross; Micky Minhas

(57) ABSTRACT

Network infrastructure management may be provided. First, administrative tools associated with a plurality of network topologies may be provided in a management console. Providing the administrative tools may comprise providing a first set of tools associated with a first network topology in the console. The first network topology may be an on-premises topology. Providing the administrative tools may also comprise providing a second set of tools associated with a second network topology in the console. The second network topology may be a cloud topology. Next, communications for the plurality of network topologies may be established to manage the plurality of network topologies through the management console. Establishing the communications for the plurality of network topologies may comprise establishing a first communications channel between the first network topology and the console. In addition, establishing the communications may comprise establishing a second communications channel between the second network topology.

17 Claims, 4 Drawing Sheets

(56) References Cited

OTHER PUBLICATIONS

Alan Murphy, "Global Distributed Service in the Cloud with F5 and VMware," pp. 1-9, Published Date : 2009, http://www.f5.com/pdf/white-papers/global-clond-f5-vmware-wp.pdf.

Jaap Wesselius, "Introduction to Exchange Server 2010," Oct. 22, 2009, 13 pgs., http://www.simple-talk.com/sysadmin/exchange/introduction-to-exchange-server-2010/.

Mathew Schwartz, "Integrating Your Cloud and On-Premises Applications,"Oct. 13, 2008, 6 pgs., http://bmightv.informationweek.com/services/showArticle.jhtml?articleID=211100217.

Sandeep J. Alur, "Enterprise Integration and Distributed Computing: A Ubiquitous Phenomenon," Sep. 2008, 11 pgs., http://msdn.microsoft.com/en-us/library/cc949110(printer).aspx.

* cited by examiner

NETWORK INFRASTRUCTURE MANAGEMENT

BACKGROUND

With Software as a Service (SaaS) becoming mainstream, enterprises are increasingly faced with decisions to evaluate and move onto new infrastructure administration models. At the same time, these enterprises, being deeply entrenched in their in-house or on-premises investments, are looking at ways of consolidating and effectively managing their complex infrastructures. With SaaS, these infrastructures could span across on-premises and cloud computing environments. This brings a burden on information technology (IT) administrators since they now have to deal with disparate systems with disparate management applications.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Network infrastructure management may be provided. First, administrative tools associated with a plurality of network topologies may be provided in a management console. Providing the administrative tools may comprise providing a first set of tools associated with a first network topology in the console. The first network topology may be an on-premises topology. Providing the administrative tools may also comprise providing a second set of tools associated with a second network topology in the console. The second network topology may be a cloud topology. Next, communications for the plurality of network topologies may be established to manage the plurality of network topologies through the management console. Establishing the communications for the plurality of network topologies may comprise establishing a first communications channel between the first network topology and the console. In addition, establishing the communications may comprise establishing a second communications channel between the second network topology.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
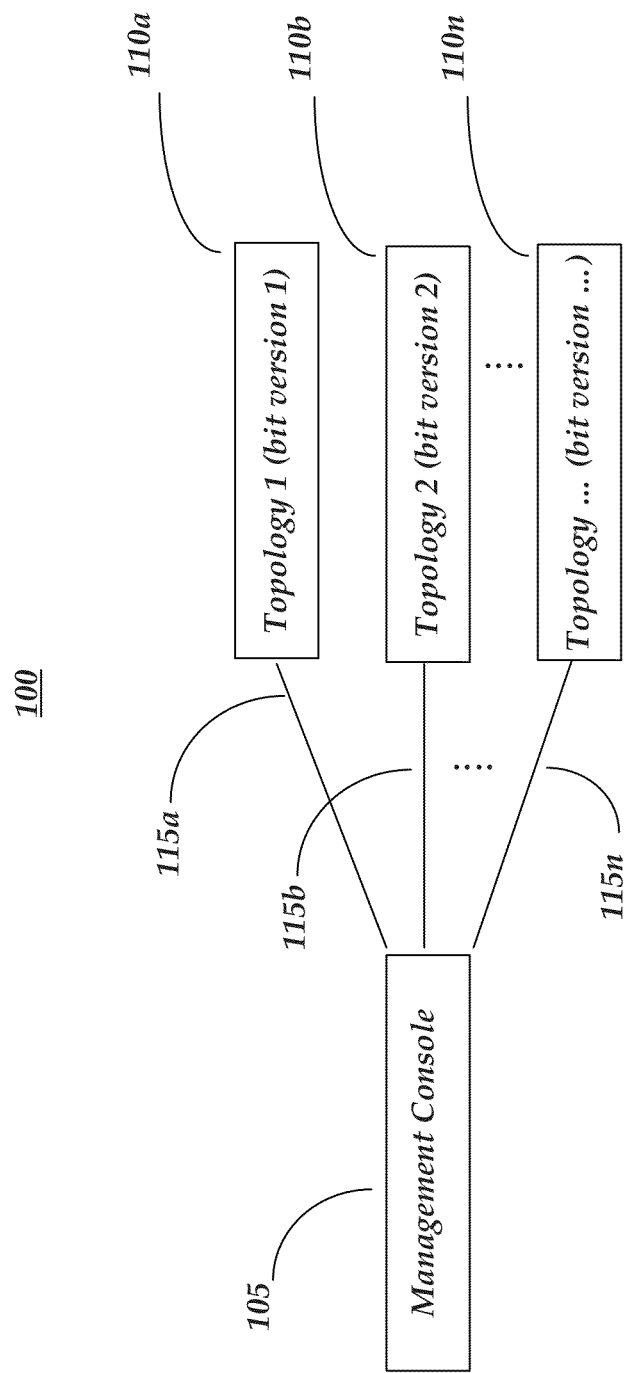
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the invention, network infrastructure management may be provided. Network infrastructure management may include a single management console that may be provided to manage both on-premises network topologies and cloud network topologies. Many IT administrators may use network management consoles that have traditionally been associated with on-premises infrastructure (e.g. on-premises topology) management. In addition to on-premises infrastructure, however, portions of network infrastructure may now reside in a cloud network topology. In this case, IT administrators may be faced with effectively managing their enterprise's overall cross-topology infrastructure. To minimize impact to the IT administrators and to maximize effectiveness in managing such cross-topology infrastructure, a single application may be provided to enable the IT administrators to manage multi-topology server infrastructures in a single management console. In addition, embodiments of the present invention may enhance existing management console applications. In this way, IT administrators may continue to use familiar tools that work consistently and effectively across their entire infrastructure setup.

FIG. 1 is a block diagram showing an operating environment of a system 100 consistent with embodiments of the invention. A management console 105 may enable the administration of various network topologies (e.g. a first network topology 110*a*, a second network topology 110*b*, and an nth network topology 110*n*) by hosting and integrating each of the network topologies into a single administrative application. For example, management console 105 may load various network administrative elements, such as, but not limited to, administrative tools, functions, configurations, data, and services operatively associated with each of the network topologies. In this way, an IT administrator may use the various network administrative elements provided by management console 105 to manage and administer each of the loaded network topologies without having to use different management applications for different network topologies.

In an on-premises network topology, network infrastructure, such as, for example, servers and storage devices, may reside locally at an enterprise (e.g., on-premises). In a cloud network topology, a virtual abstraction may be provided between a computing resource and its underlying technical architecture (e.g., servers, storage, networks). As such, on-premises administrators may not have physical access to the underlying infrastructure of the cloud computing network environment. Consequently, this virtual abstraction may be provided via a computing environment, enabling on-demand network access to a shared pool of configurable computing resources associated with the cloud's underlying technical architecture.

Consistent with embodiments of the invention, management console 105 may be operative with both on-premises network topologies and cloud network topologies. For example, first network topology 110*a* may be an on-premises topology of a first bit version, while second network topology 110*b* may be a cloud network topology of a second bit version. Management console 105 may choose and download a compatible bit version associated with each topology. In this way, management console 105 may support different types of network topologies as well as different bit versions of the network topologies.

Consistent with embodiments of the invention, first network topology 110*a* may comprise on-premises network infrastructure, while second network topology 110*b* may comprise network infrastructure in a cloud computing environment. Management console 105 may provide communications channels between the infrastructure associated with the cloud network topology and the infrastructure associated with the on-premises network topology. For example, a communications channel 115*a* may be established between management console 105 and first network topology 110*a*. Similarly, a second communications channel 115*b* may be established between management console 105 and second network topology 110*b*, and an nth communications channel 115*n* may be established between management console 105 and nth network topology 110*n*. In this way, when first network topology 110*a* needs to communicate with second network topology 110*b*, communication channels 115*a* and 115*b* may be used to direct the communication through management console 105. Accordingly, communication channels directly between each topology may not be necessary, as one network topology may communicate with another network topology via management console 105 and corresponding communication channels.

Figure 2:
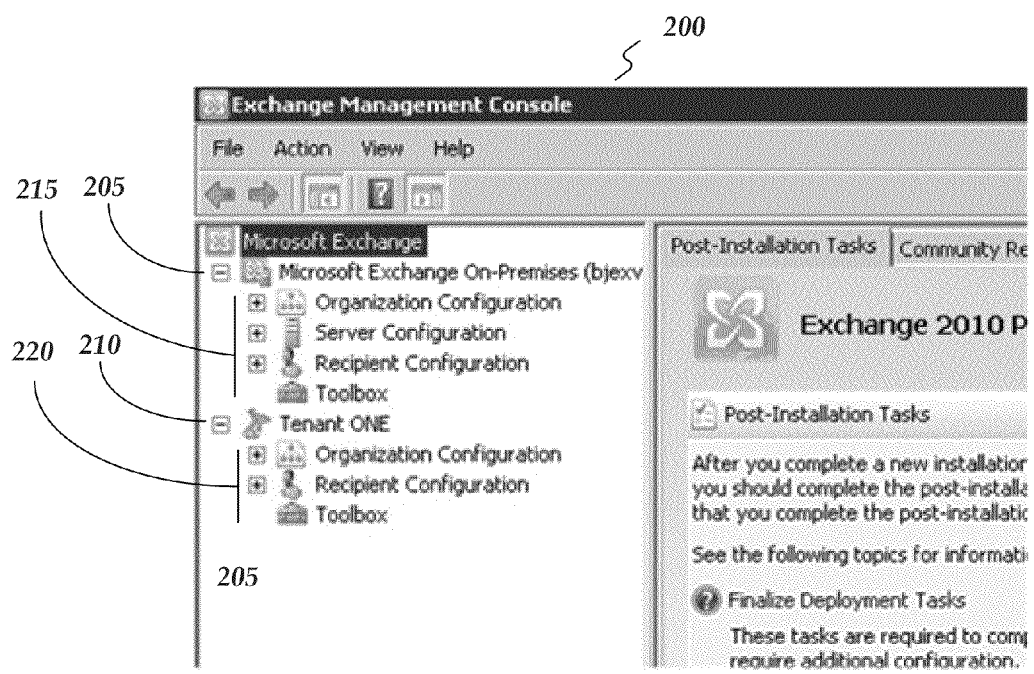
FIG. 2 is a screenshot of a single management console.

FIG. 2 is a screenshot of a single management console 200 consistent with embodiments of the invention. Single management console 200 may be, for example, a Microsoft® Management Console, or a Microsoft® Exchange Management Console. However, consistent with various embodiments of the invention, management console 200 may be any application capable of managing and administering multi-topology server infrastructures. As illustrated in FIG. 2, management console 200 may load application domains associated with both an on-premises network topology, as shown in a first console area 205, and a cloud network topology, as shown in a second console area 210, so as to host them together in a single user interface. Once management console 200 is associated with the network topologies, various network administrative elements may be loaded, such as, for example, various administrative tools, functions, configurations, and services for each connected network topology. These administrative elements may be represented as user-interface elements 215 and 220 in management console 200. User-interface elements 215 and 220 may comprise representations of the on-premises network topology in first console area 205 and representations of the cloud network topology in second console area 210. User-interface elements 215 and 220 may further comprise representations of network data, configuration, and service elements, which may be manipulated by an IT administrator with 'Drag-and-Drop' actions as described in more detail below. In this way, the IT administer may be provided with the administrative elements for administering and managing the connected network topologies.

In various embodiments of the invention, these administrative elements may be loaded as application plug-ins. The administrative elements may comprise, for example, representations of underlying data, functions, configurations, and services associated with each connected network topology. Furthermore, the administrative elements may be functional with, for example, Structured Query Language (SQL) services, Customer Relationship Management (CRM) services, and Microsoft® Exchange services, as the connected network topologies may have infrastructure associated with each of the SQL, CRM, and Exchange server platforms.

Figure 3:
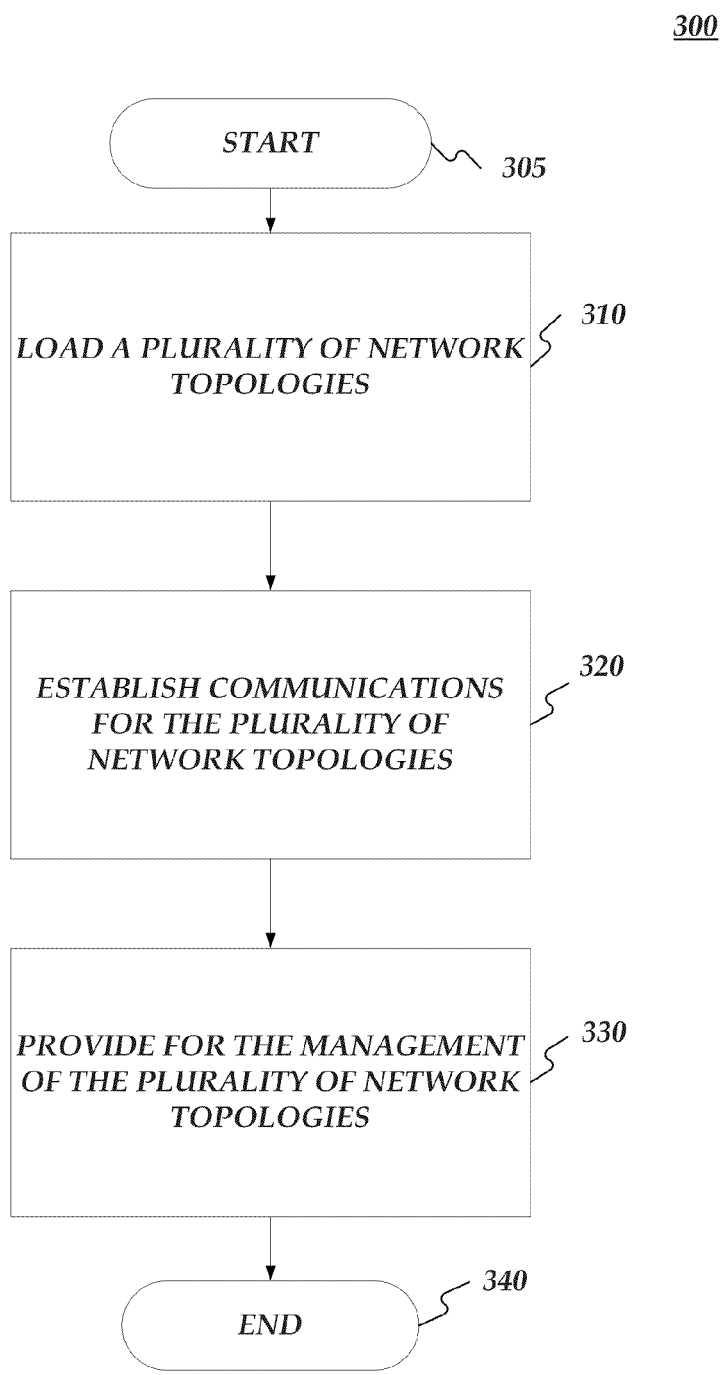
FIG. 3 is a flow chart of a method for providing network infrastructure management.

FIG. 3 is a flow chart setting forth the general stages involved in a method 300 consistent with embodiments of the invention for providing network infrastructure management. Method 300 may be implemented using a computing device 400 as described in more detail below with respect to FIG. 4. Ways to implement the stages of method 300 will be described in greater detail below.

Method 300 may begin at starting block 305 and proceed to stage 310 where computing device 400 may load a plurality of network topologies into management console 200. For example, a first set of console tools and functionalities associated with an on-premises network topology may be provided in management console 200. Similarly, a second set of console tools and functionalities associated with a cloud network topology may be provided in management console 200. In this way, computing device 400 may load network topologies into management console 200 for the administration and management of the network topologies, and administrative tools and functionalities for managing the plurality of network topologies may be subsequently provided in management console 200.

Consistent with embodiments of the invention, a first network topology representation of a first network topology 110*a* may be displayed in first console area 205 associated with the first network topology 110*a* (e.g. on-premises topology). Similarly, a second network topology representation of a second network topology 110*b* may be displayed in second console area 210 associated with the second network topology 110*b* (e.g. cloud network topology). Furthermore, user interface elements 215 and 220 comprising representations of, for example, administrative tools, functions, configurations, and services associated with each loaded network topology may be displayed in a console area associated with each corresponding loaded network topology. In this way, management console 200 may represent each network topology loaded by computing device 400, as well as console tools and functionalities associated with each loaded network topology.

From stage 310, where computing device 400 loads the plurality of network topologies into management console 200, method 300 may advance to stage 320 where computing device 400 may establish communications for the plurality of network topologies. For example, a first communication channel 115*a* may be provided from first network topology 110*a* (e.g. the on-premises network topology) to management console 200, and a second communications channel 115*b* may be provided from second network topology 110*b* (e.g. the cloud network topology) to management console 200. Similarly, additional communication channels 115*n* may be established between each additional connected network 110*n* and management console 200. In this way, when infrastructure associated with any one of the connected network topologies needs to communicate with infrastructure associated with any other connected network topology, the communication may be channeled through management console 200.

Once computing device 400 establishes communications for the plurality of network topologies in stage 320, method 300 may continue to stage 330 where computing device 400 may proceed to provide for the management of the plurality of network topologies connected to management console 200. For example, managing the network topologies may comprise transferring network data, functionalities, configurations, services, or any elements thereof, from one network topology to another network topology via management console 200. Consistent with embodiments of the invention, an IT administrator may drag a console representation of, for example, a provided data or service from a first console area associated with a first network topology, to a second console area associated with a second network topology. Computing device 400 may detect this "dragging and dropping" and, in response, transferring functionalities associated the provided data or service accordingly. In this way, the IT administrator may effectively transfer, for example, the storage or operation of the represented data or service on the first network topology, to now be stored or operative on the second network topology. Such transferring of data or services may employ, for example, the communication mechanisms established in stage 320.

Consistent with embodiments of the invention, a transfer of network data, functionalities, configurations, services, or any elements thereof, may comprise, for example, a transfer of electronic mailboxes associated with an on-premises network topology. For example, an IT administrator may select a console representation associated with the electronic mail boxes provided in the first console area, and drag the console representation associated with the electronic mail boxes to the second console area. In this way, management console 200 may transfer the network data, functionalities, configurations, services, or any elements thereof, associated with the electronic mailboxes from the on-premises network topology to the cloud network topology. Similarly, the network data, functionalities, configurations, services, or any elements thereof, associated with the electronic mailboxes may be transferred from the cloud network topology to the on-premises network topology. Accordingly, embodiments of the invention may allow for a first portion of a plurality of electronic mailboxes to be associated with a first network topology, while a second portion of the plurality of electronic mailboxes may be associated with a second network topology. After computing device 400 provides management of the plurality of network topologies connected to single management console 200 in stage 340, method 300 may then end at stage 350.

Embodiments consistent with the invention may comprise a system for providing network infrastructure management. The system may comprise a memory storage and a processing unit coupled to the memory storage. The processing unit may be operative to: i) provide, into a management console, administrative tools associated with a plurality of network topologies comprising an on-premises network topology and a cloud network topology; and ii) establish communications for the plurality of network topologies to manage the plurality of network topologies through communications channels established between each of the plurality of network topologies and the console.

Other embodiments consistent with the invention may comprise a system for providing network infrastructure management. The system may comprise a memory storage and a processing unit coupled to the memory storage. The processing unit may be operative to: i) provide, into a management console, console functionalities associated with a plurality of network topologies comprising an on-premises network topology and a cloud network topology; and ii) establish communications for the plurality of network topologies, enabling the plurality of network topologies to intercommunicate through the management console.

Yet other embodiments consistent with the invention may comprise a system for providing network infrastructure management. The system may comprise a memory storage and a processing unit coupled to the memory storage. The processing unit may be operative to: i) display an on-premises network topology representation in a management console; ii) display a cloud network topology representation in the console; iii) establish a first communications channel between the on-premises network topology and the console, iv) establish a second communications channel between the cloud network topology and the console; and v) provide management tools for managing the on-premises network topology and the cloud network topology.

Figure 4:
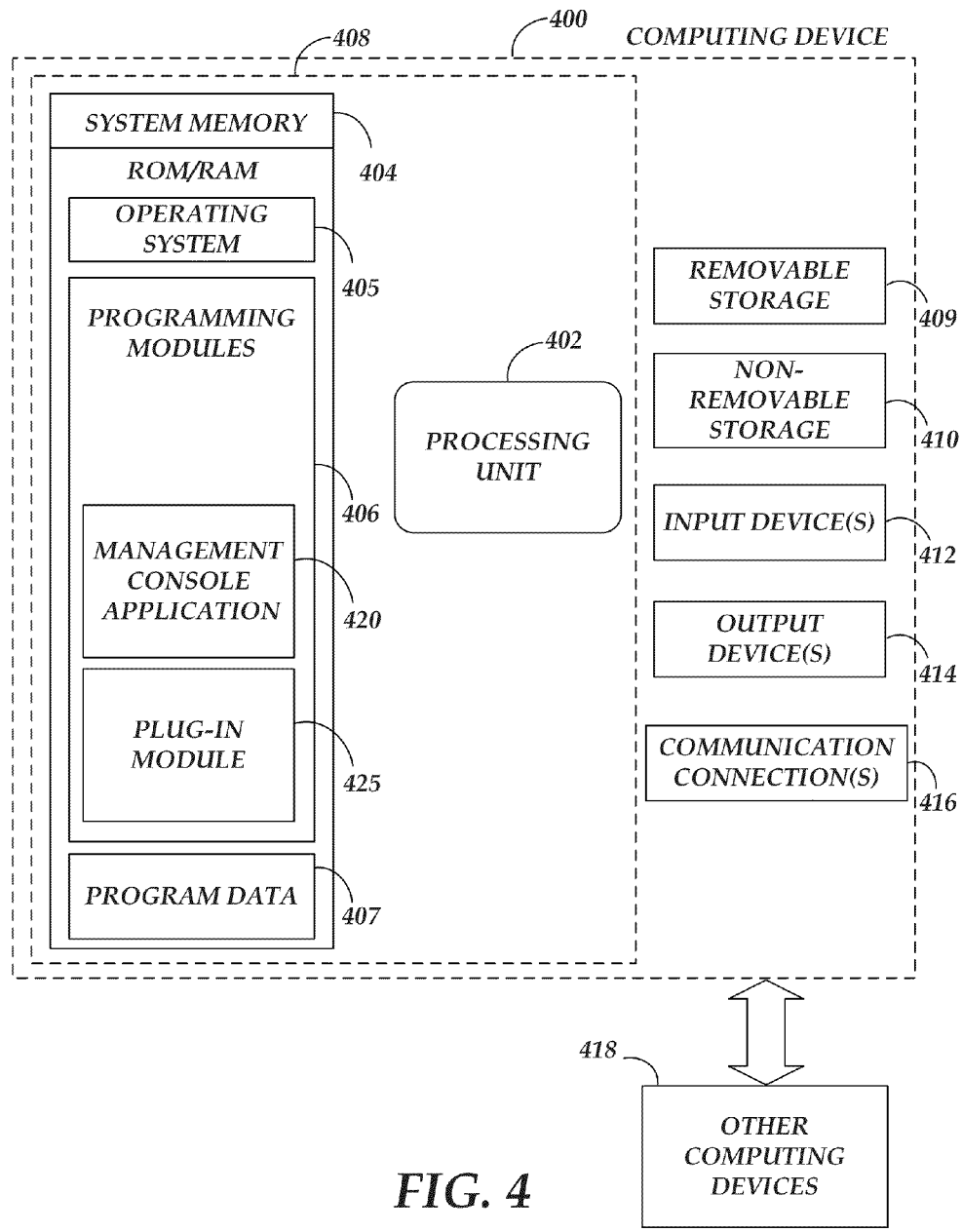
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for system 100 as described above. System 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. Consistent with embodiments of the invention, programming modules 406 may include a plug-in module 425 operatively associated with a management console application 420. The plug-in module may provide for the enhancement of an existing management console application, enabling the existing management console application to be operative with different network topologies. In addition, plug-in module may provide additional administrative elements for managing and administering network topologies connected to management console application 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. management console application 420) may perform processes including, for example, one or more method 300's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing network infrastructure management, the method comprising:
   providing administrative tools associated with a plurality of network topologies in a management console, wherein providing the administrative tools associated with the plurality of network topologies in the management console comprises,
      providing a first set of tools associated with a first network topology in the management console, the first network topology being an on-premises topology, and
      providing a second set of tools associated with a second network topology in the management console, the second network topology being a cloud topology;
   displaying the management console in a user interface, wherein the management console comprises:
      a first console area displaying the first set of tools associated with the first network topology, and
      a second console area displaying the second set of tools associated with the second network topology;
   transferring data from one of: the first network topology and the second network topology to a remaining one of: the first network topology and the second network topology;
   in response transferring the data, transferring at least one of the administrative tools, wherein the transferred at least one of the administrative tools is associated with one of: the first network topology and the second network topology, and corresponds to the data; and
   establishing communications for the plurality of network topologies to manage the plurality of network topologies through the management console, wherein establishing the communications for the plurality of network topologies comprises:
      establishing a first communications channel between the first network topology and the management console, and
      establishing a second communications channel between the second network topology and the management console.

2. The method of claim 1, wherein transferring the data comprises transferring the data in response to:
   detecting a dragging of a representation of the data from the first console area associated with one network topology, the representation of the data being provided by the management console, and
   detecting a dropping of the representation of the data at the second console area associated with another network topology.

3. The method of claim 1, wherein transferring the data comprises transferring the data via the first communications channel between the first network topology and the console and the second communications channel between the second network topology and the management console.

4. The method of claim 1, wherein transferring the data comprises transferring at least one electronic mail box from a plurality of electronic mail boxes.

5. The method of claim 1, further comprising:
   selecting a bit version associated with each network topology, and
   downloading the bit version associated with each network topology.

6. The method of claim 1, further comprising transferring at least one service from one of: the first network topology and the second network topology to a remaining one of: the first network topology and the second network topology.

7. The method of claim 1, wherein providing the administrative tools associated with the plurality of network topologies comprises providing at least one administrative tool associated with at least one of the following: a Structured Query Language (SQL) service, a Customer Relationship Management (CRM) service, and a Microsoft Exchange service.

8. A computer-readable storage device having a set of instructions which when executed performs a method for providing network infrastructure management, the method executed by the set of instructions comprising:
   providing console functionalities associated with a plurality of network topologies in a management console, wherein providing the console functionalities associated with the plurality of network topologies in the console comprises:
      providing a first set of console functionalities associated with a first network topology in the management console, the first topology being an on-premises topology, and
      providing a second set of console functionalities associated with a second network topology in the management console, the second network topology being a cloud topology;
   displaying the management console in a user interface, wherein the management console comprises:
      a first console area displaying the first set of console functionalities associated with the first network topology, and
      a second console area displaying the second set of console functionalities associated with the second network topology;
   transferring data from one of: the first network topology and the second network topology to a remaining one of: the first network topology and the second network topology;
   in response transferring the data, transferring at least one of the administrative tools, wherein the at least one of the administrative tools is associated with one of: the first network topology and the second network topology, and corresponds to the data; and
   establishing communications for the plurality of network topologies, the communications being configured to allow infrastructure associated with the plurality of network topologies to communicate with each other through the management console.

9. The computer-readable storage device of claim 8, wherein establishing the communications for the plurality of network topologies comprises:
   establishing a first communications channel between infrastructure associated with the first network topology and the management console, and establishing a second communications channel between infrastructure associated with the second network topology and the management console.

10. The computer-readable storage device of claim 8, wherein transferring the at least one service comprises transferring the at least one service in response to:
   detecting a dragging of a console representation of the at least one service from a first console area associated with one network topology, and
   detecting a dropping of the console representation of the at least one service at a second console area associated another network topology.

11. The computer-readable storage device of claim 8, wherein transferring the at least one service comprises transferring the at least one service via a first communications channel between infrastructure associated with the first network topology and the management console and a second communications channel between infrastructure associated with the second network topology and the management console.

12. The computer-readable storage device of claim 8, wherein transferring the at least one service comprises transferring at least one electronic mail box from a plurality of electronic mail boxes such that a first portion of the plurality of electronic mail boxes is associated with the first network topology and a second portion of the plurality of electronic mail boxes is associated with the second network topology.

13. The computer-readable storage device of claim 8, wherein providing the console functionalities associated with plurality of network topologies comprises at least one of the following:
   selecting a bit version associated with each network topology, and
   downloading the bit version associated with each network topology.

14. The computer-readable storage device of claim 8, further comprising providing administrative tools for administrating the plurality of network topologies.

15. The computer-readable storage device of claim 8, wherein providing the console functionalities associated the plurality of network topologies comprises loading the plurality of network topologies with at least one network topology of the plurality of network topologies being associated with at least one of the following: a Structured Query Language (SQL) server, a Customer Relationship Management (CRM) server, and a Microsoft Exchange server.

16. A system for providing network infrastructure management, the system comprising:
   a memory storage;
   a processing unit coupled to the memory storage, wherein the processing unit is operative to:
      display an on-premises network topology representation in a management console, the on-premises network topology representation being associated with an on-premises network topology,
      display a cloud network topology representation in the console, the cloud network topology representation being associated with a cloud network topology,
      transfer data from one of: the on-premises network topology and the cloud network topology to a remaining one of: the on-premises network topology and the cloud network topology;
      in response to the processing unit being operative to transfer the data, transfer at least one administrative tool, wherein the at least one administrative tool is associated with one of: the on-premises network topology and the cloud network topology, and corresponds to the data; and
      establish a first communications channel between the on-premises network topology and the console,
      establish a second communications channel between the cloud network topology and the console, and
      provide management tools for managing the on-premises network topology associated with the cloud network topology; and
   a display unit coupled to the processing unit, wherein the display unit is operative to:
      display the management console in a user interface, wherein the management console comprises:
         a first console area displaying the on-premises network topology representation being associated with the on-premises network topology, and
         a second console area displaying the cloud network topology representation being associated with the cloud network topology.

17. The system of claim 16, wherein the processing unit is further operative to enable a dragging and dropping of a console representation of the at least element of the network service from one console area associated with the on-premises network topology to another console area associated with the cloud network topology.

* * * * *